Patented Sept. 5, 1944

2,357,667

UNITED STATES PATENT OFFICE 2,357,667

SOLVENT EXTRACTION

Wayne E. Kuhn, Scarsdale, N. Y., assignor to The Texas Company, New York, N. Y., a corporation of Delaware No Drawing. Application March 27, 1943, Serial No. 480,847

6 Claims. (Cl. 196—13)

This invention relates to solvent extraction and particularly to separation of liquid mixtures into components of different chemical constitution or of different physical character with a solvent liquid having selective action as between components of the feed mixture undergoing treatment.

The invention contemplates employing as a selective solvent morpholine having an aldehyde or ketone grouping attached to the morpholine ring, either directly or through a linking radical. The resulting compounds have a high degree of polarity, and will be designated hereinafter as aldehydo- and keto-morpholines.

Aldehydo- and keto-morpholines are effective as extraction solvents for hydrocarbon oil to separate the oil into fractions which are respectively rich in relatively unsaturated and relatively saturated constituents. Thus, the oil may be treated with these solvents under suitable conditions of temperature so as to form extract and raffinate phases. The extract phase comprises a major portion of the solvent having unsaturated constituents of the feed oil dissolved therein. The raffinate phase comprises a minor portion of the solvent mixed with relatively saturated constituents of the oil. These phases may be separated and the solvent liquid removed therefrom.

The invention thus has application to the treatment of lubricating oil stocks for the purpose of extracting low viscosity index constituents from the oil so as to produce lubricating oil of improved viscosity index and having other properties characteristic of superior lubricating oils.

Morpholine, which is already known, has the following chemical structure:

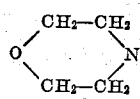

The aldehydo-morpholines and keto-morpholines may be represented by the following empirical formula:

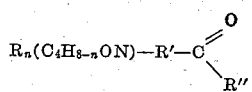

where R is an alkyl group;
n may have a value ranging from 0 up to about 8;
R' may be either absent or else represent a bivalent hydrocarbon radical; and
R'' represents either hydrogen or a hydrocarbon group.

When R'' represents hydrogen the compound is an aldehydo-morpholine, whereas when R'' represents a hydrocarbon group the compound is a keto-morpholine.

By way of example the aldehyde groupings may comprise aldehyde groupings corresponding to formaldehyde, acetaldehyde, benzaldehyde, salicylaldehyde, furaldehyde, etc. Thus where the aldehyde grouping corresponds to formaldehyde the aldehyde grouping is attached directly to the morpholine ring so that R' in the foregoing formula is absent. On the other hand if the aldehyde grouping corresponds to acetaldehyde R' in the foregoing formula corresponds to the methylene radical $CH_2$.

In the case of the formaldehyde type of grouping the resulting compound is referred to as formyl-morpholine, of which there are three different compounds having the following formulas:

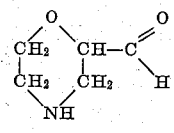

2-formylmorpholine

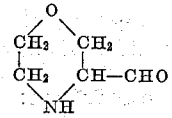

3-formylmorpholine

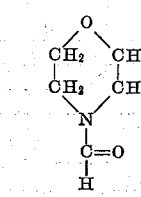

4-formylmorpholine

In the case of the keto-morpholines the ketone groupings may correspond to acetone, acetophenone, etc.

Solvents of the present invention may be prepared in a number of ways. One such method for preparing 4-formylmorpholine involves reacting morpholine and formic acid as described in Chemical Abstracts 30, 7577, 1936. A quantity of 4-formyl-morpholine was prepared in accordance with this method and found to be a clear, white, viscous liquid miscible with water in all proportions, boiling in the range about 460 to 466° F. and having a melting point in the range about 70 to 73° F.

4-formyl-morpholine prepared in the foregoing manner was employed to extract a dewaxed distillate lubricating oil and also to extract a dewaxed residual lubricating oil stock derived from mixed base crude. In each case one part by volume of dewaxed oil was mixed with two parts by volume of the solvent and the resulting mixture subjected to extraction at different temperatures as will be indicated below. Extract and raffinate phases were formed and the resulting phases separated, following which the solvent was recovered from the oil.

The distillate oil was of the following character:

| | |
|---|---|
| Saybolt-Universal viscosity at 100° F. seconds | 539 |
| Saybolt-Universal viscosity at 210° F. seconds | 60 |
| Refractive index $n_D^{60}$ | 1.4912 |
| Viscosity index | 64.2 |

The yield and quality of the raffinate and also the refractive index of the extract obtained by extracting this distillate at temperatures of 210, 270 and 330° F. were as follows:

| Extraction temperature °F | 210 | 270 | 330 |
|---|---|---|---|
| Raffinate: | | | |
| Per cent by volume of charge distillate | 90.6 | 83.1 | 52.5 |
| Refractive index $n_D^{60}$ | 1.4806 | 1.4785 | 1.4770 |
| Viscosity index | 74.9 | 77.5 | 79.4 |
| Extract: | | | |
| Refractive index $n_D^{60}$ | 1.5931 | 1.5542 | 1.5069 |

The dewaxed residual lubricating oil stock was of the following character:

| | |
|---|---|
| Saybolt-Universal viscosity at 100° F. seconds | 814 |
| Saybolt-Universal viscosity at 210° F. seconds | 251 |
| Refractive index $n_D^{60}$ | 1.5083 |
| Viscosity index | 73 |

The yield and quality of the raffinate and also the refractive index of the extract obtained by extracting this distillate at temperatures of 260 and 330° F. were as follows:

| Extraction temperature °F | 260 | 330 |
|---|---|---|
| Raffinate: | | |
| Per cent by volume of residual oil | 89.6 | 86.7 |
| Refractive index $n_D^{60}$ | 1.4978 | 1.4960 |
| Viscosity index | 81.7 | 83.5 |
| Extract: | | |
| Refractive index $n_D^{60}$ | 1.5990 | 1.5888 |

Although the specific examples described above deal with the extraction of lubricating oil stocks nevertheless it is contemplated that the solvents of this invention may be employed for treating other fractions of petroleum, such as naphtha, kerosene, Diesel oils, etc. The solvents may be used also for the treatment of oils derived from sources other than petroleum, as, for example, oils and oily mixtures obtained from animal, vegetable and fish sources. They may be employed for effecting fractional separation of fatty acid mixtures, etc.

Conventional extraction procedures may be employed involving either stage or continuous countercurrent or concurrent extractions. If desired the solvents may be employed in conjunction with other solvent or diluent liquids such as light petroleum fractions.

Since the solvents of this invention are miscible with water in all proportions, in using them to extract hydrocarbon oil, the oil may be completely dissolved in a sufficiently large body of the solvent and then be fractionally precipitated from solution in the solvent by addition of increments of water.

On the other hand in continuous concurrent or countercurrent extraction procedures a small amount of water may be added initially to the solvent stream entering the extraction apparatus so that the extraction is effected with a solvent which comprises an aldehydo-morpholine or keto-morpholine containing a minor proportion of water, for example, ranging from about 1 or 2% to 25% or more.

The morpholine compounds disclosed above may be used alone or in admixture with water for the purpose of effecting separation and purification of aromatic hydrocarbons. Thus, the solvents may be used to extract aromatic hydrocarbons such as benzene and toluene from naphtha fractions containing them. Naphtha derived from cracking or other conversion operations may contain substantial amounts of aromatic hydrocarbons in addition to other hydrocarbons including olefinic and paraffinic hydrocarbons and it is contemplated employing the solvents for effecting separation between the benzenoid and non-benzenoid hydrocarbons.

It is also contemplated that the solvent may be used as a component of a dewaxing solvent mixture in effecting separation between liquid and solid hydrocarbons.

Obviously many modifications and variations of the invention, as hereinbefore set forth, may be made without departing from the spirit and scope thereof, and therefore only such limitations should be imposed as are indicated in the appended claims.

I claim:

1. A process of separating a hydrocarbon mixture into components of different chemical constitution which comprises extracting the feed mixture with a solvent consisting essentially of a compound selected from the group consisting of aldehydo-morpholines and ketomorpholines, effecting the extraction at a temperature in the range about 210 to 330° F. such that an extract phase is formed comprising a major portion of solvent and hydrocarbon components of the feed soluble therein and a raffinate phase comprising a relatively minor portion of the solvent and hydrocarbon components relatively insoluble in the solvent, separating the resulting phases and removing solvent therefrom.

2. A process of separating an oil mixture into components of different chemical constitution which comprises extracting the feed mixture with a solvent consisting essentially of aldehydo-morpholine, effecting the extraction at a temperature in the range about 210 to 330° F. such that an extract phase is formed comprising a major portion of solvent and components of the feed soluble therein and a raffinate phase comprising a relatively minor portion of the solvent and components relatively insoluble in the solvent, separating the resulting phases and removing solvent therefrom.

3. A process of separating hydrocarbon oil into relatively saturated and relatively unsaturated components which comprises extracting the oil with a solvent consisting essentially of formyl-morpholine, effecting the extraction at a temperature in the range about 210 to 330° F. such that an extract phase is formed comprising a major portion of the solvent and unsaturated components of the oil dissolved therein and a raffinate phase comprising a minor portion of the solvent and relatively saturated components of the oil, separating the resulting phases and removing solvent therefrom.

4. A process of separating lubricating oil stock into fractions of different viscosity index which comprises extracting the feed with a solvent consisting essentially of a compound selected from the group consisting of 2-formyl-morpholine, 3-formyl-morpholine and 4-formyl-morpholine, effecting the extraction at a temperature in the range about 210 to 330° F. such that an extract phase is formed comprising a major portion of the solvent and constituents of low viscosity index dissolved in the solvent and a raffinate phase comprising a minor portion of the solvent and constituents of relatively high viscosity index, separating the two phases and removing solvent therefrom.

5. A process for effecting separation between benzenoid and non-benzenoid hydrocarbon constituents of naphtha which comprises extracting naphtha with a solvent consisting essentially of a compound selected from the group consisting of 2-formyl-morpholine, 3-formyl-morpholine, and 4-formyl-morpholine, forming an extract phase comprising benzenoid hydrocarbons dissolved in a major portion of the solvent and a raffinate phase comprising non-benzenoid hydrocarbons mixed with a minor portion of the solvent, separating the two phases from each other and removing solvent from the separated phases.

6. A process of separating an oil mixture into components of different chemical constitution which comprises extracting the feed mixture with a solvent consisting essentially of a compound selected from the group consisting of aldehydo-morpholines and keto-morpholines, effecting the extraction at a temperature in the range about 210–330° F. such that an extract phase is formed comprising a major portion of solvent and components of the feed soluble therein and a raffinate phase comprising a relatively minor portion of the solvent and components relatively insoluble in the solvent, separating the resulting phases and removing solvent therefrom.

WAYNE E. KUHN.